though the invention is disclosed in terms of a cable test set, the circuit
United States Patent Office 3,502,971
Patented Mar. 24, 1970

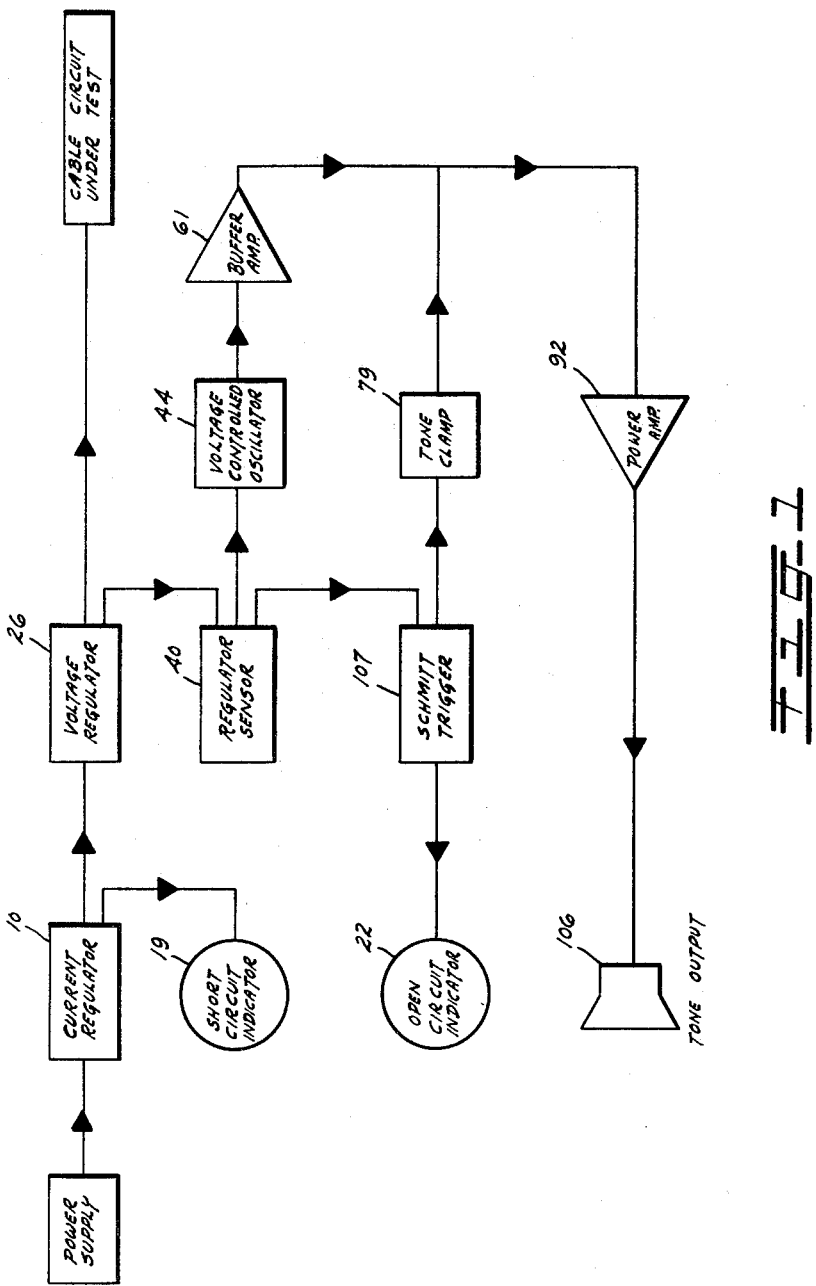

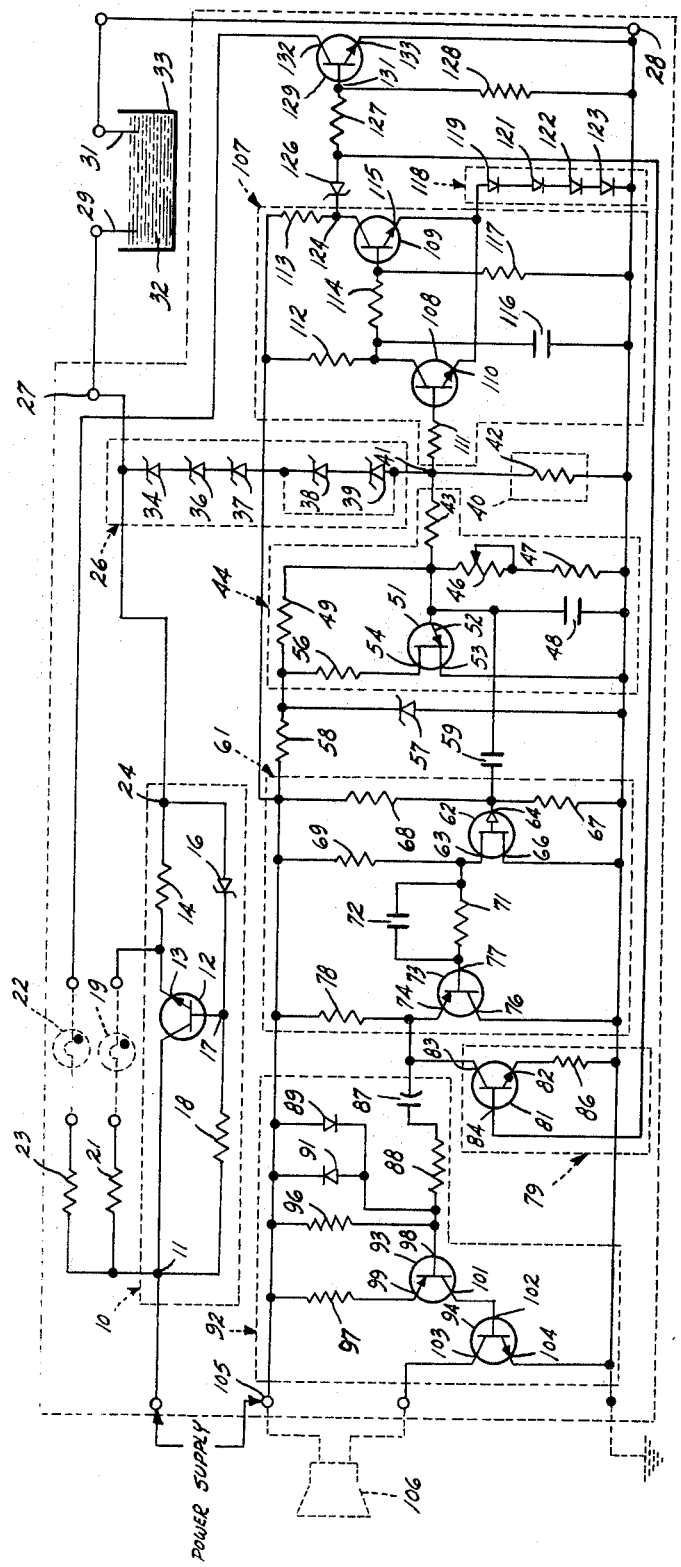

3,502,971
TEST CIRCUIT INCLUDING OSCILLATOR MEANS, TRIGGER MEANS AND SWITCH MEANS FOR DETERMINING VOLTAGE DROP
John J. Glosek, Roselle, N.J., assignor to Western Electric Company, Incorporated, New York, N.Y., a corporation of New York
Filed Jan. 10, 1968, Ser. No. 696,769
Int. Cl. G01r 27/14
U.S. Cl. 324—64
5 Claims

ABSTRACT OF THE DISCLOSURE

A transistorized test circuit for detecting opens and shorts in conductor pairs of electrical cable. If the conductor pair under test is neither open or short, an audible tone is produced. However, if the conductor pair is either open or short, an appropriate indicator lamp is illuminated and the audible tone is not produced.

BACKGROUND OF THE INVENTION

In the manufacture of multiconductor electrical cable it is necessary to test each pair of conductors in the cable for opens and shorts; that is, to determine if there is a break in either of the two conductors or if the conductors are in electrical contact with each other or any other conductor in the cable anywhere along their length. In testing an electrical cable it is desirable to give an operator a rapid, unmistakable indication of the condition of each conductor pair with a minimum of equipment and preparation for each test. Further, in the interest of rapidity of testing, it is particularly desirable to be able to make all measurements from a single end of the cable.

One solution to the problem has been provided by coating one end of a cable with a conductive fluid and then applying a test voltage to each of the conductors at the opposite end. An open or short condition in a conductor pair is indicated by the imbalance of a Wheatstone bridge or the operation of a relay. Some systems have even used a relay operated buzzer to provide an audible indication that the conductor pair is neither open nor short.

While single-ended cable testing techniques are known, the use of bridges and relays to detect faults in conductor pairs is severely lacking in stability and in sensitivity to small voltage differences. Additionally, electromechanical methods of testing are slower and less reliable than purely electronic systems.

SUMMARY OF THE INVENTION

One solution to these problems is found in the use of an electronic circuit constructed in accordance with the instant invention. In one embodiment, a first end of a cable, containing conductor pairs to be tested, is immersed in a fluid of known conductivity to provide a resistive connection between each of the conductors in the cable. A constant current source is employed to effect current flow into the second end of a selected pair of conductors to be tested and the voltage across the ends of these conductors is monitored. If the pair of conductors is neither open nor short, the voltage rises to a first predetermined value and triggers the operation of a voltage sensitive oscillator. The output of the oscillator is applied to a buffer amplifier, a power amplifier, and a speaker to produce an audible output and indicate that the pair is satisfactory.

If, on the other hand, the pair under test is open, the voltage rises to a second, higher predetermined value and, even though the oscillator is triggered into operation by the first voltage, a clamp circuit is actuated which shunts the output of the buffer amplifier and prevents the production of an audible signal. Likewise, the operation of the clamp circuit turns on a first indicator lamp to signal that the pair is open. If the pair under test is shorted out, the voltage being monitored never reaches the first predetermined voltage and the oscillator is not triggered. Similarly, a shorted pair causes a demand for increased current from the constant current source which turns on a second indicator lamp to signal that the pair is short.

As is apparent from the description, although the invention is disclosed in terms of a cable test set, the circuit may be used in any situation where it is necessary to determine when a signal is between, above, or below a pair of predetermined voltages. Another application might be sorting resistors into various groups following manufacture.

BRIEF DESCRIPTION OF THE DRAWING

FIG. 1 is a block diagram of the basic elements of the test set; and
FIG. 2 is a schematic diagram of the circuit.

DETAILED DESCRIPTION

Referring to FIG. 1, the test set utilizes a power supply and a constant current regulator 10 which supplies current to a conductor pair in a cable which is under test. One end of the conductor pair is terminated by a fluid of substantially fixed resistance and the voltage across the other end of the conductor pair is monitored by a voltage regulator 26. The current shunted by the regulator 26 is detected by a regulator sensor 40. If the conductor pair is neither short nor open, the voltage at the regulator sensor 40 rises above a first predetermined value and a voltage controlled oscillator 44 is triggered into operation. The output of the oscillator 44 is amplified first by a buffer amplifier 61 and then by a power amplifier 92 which is used to drive a tone output speaker 106.

If the conductor pair under test is open, the voltage across the regulator sensor 40 rises above a second predetermined value and actuates a Schmitt trigger 107 which operates a tone clamp 79 to shunt the output of the buffer amplifier 61 and prevent the production of an audible signal at the tone output 106. At the same time the Schmitt trigger 107 operates the tone clamp 79, it actuates an open circuit indicator 22.

If the conductor pair under test is shorted, the voltage across the regulator sensor 40 does not reach the level of the first predetermined voltage and the voltage controlled oscillator 44 does not operate to produce an output tone from the speaker 106. Instead, the increased demand for current from the current regulator 10, due to the shorted pair, actuates a short circuit indicator 19.

Referring to FIG. 2 for a more detailed explanation of operation, the test circuit utilizes two positive power supplies referenced to the same common ground point. These power supplies can be provided from either a tapped battery or from a filtered, rectified alternating current source. The filtering need not be extensive since the test circuit itself inherently provides a high degree of filtering. The main power supply of approximately 135–160 volts D.C. is introduced into the circuit at a first input terminal 11 of the current limiting circuit 10. The secondary power supply has a nominal output of approximately 22.5 volts D.C. and is connected to the circuit at a second input terminal 105. The secondary power supply also provides power to a speaker 106.

The current limiting circuit 10 comprises a transistor 12 having a high voltage rating, a resistor 14 in parallel with the base-emitter junction 17–13 of the transistor 12, a Zener diode 16 and a bleeder resistor 18. The Zener diode 16 and the resistor 14, in combination, perform the function of current regulation. While the transistor 12 senses the voltage across the Zener diode 16, it also modulates the current according to the voltage drop across the resistor 14. The resistor 18 provides a shunt path to allow current to pass to the Zener diode 16. The effect, thus, of the current limiting circuit 10 is to restrict the current output to approximately 5 ma. which has been found to be an adequate, safe operating current.

Connected to an output point 24 of the current limiting circuit 10 is a voltage regulator branch 26 which is connected in parallel with the conductors 29, 31 of the conductor pair under test. One conductor 29 is connected to a first terminal 27 of the test circuit, whereas, the other conductor 31 is connected to a second terminal 28 which is at ground potential. The conductor pair 29, 31 can be any insulated wire as long as the bare wire at the free end is exposed to a conductive solution 32 contained in a tank 33. The constituents of the conductive solution 32 can be varied depending on the electrical properties desired. For example, a typical solution can contain 3% water, 89% propylene glycol, 8% glycerine (all by volume) plus 0.2 ounce (by weight) of boroax per gallon of liquid. The water and/or borax content is then adjusted to provide a specific conductivity of 15.5±1.0 micromhos at 77° F.

The voltage regulator branch 26 is comprised of a plurality of series connected Zener diodes 34, 36, 37, 38, 39. Depending on the voltage across the ends of the conductor pair 29, 31 under test, which is connected to the output 24 of the current limiting circuit 10, the voltage regulator branch 26 will selectively actuate the remainder of the test circuit. That is, unless the voltage across the ends of the conductive pair 29, 31 is greater than the combined breakdown potentials of the series connected Zener diodes 34, 36, 37, 38, 39, no current is allowed to flow to a regulator sensor 40 which is connected between the Zener diodes and ground. The use of Zener diodes gives a very sharp breakdown point and the voltage value at which breakdown occurs may be precisely regulated. A typical breakdown voltage for the series connected Zener diodes might be 100 volts.

At the output of the voltage regulator branch 26 is a junction 41 from which the remainder of the test set circuits branch. One branch is comprised of a resistor 42 which acts as a regulator sensor; thus, until the voltage regulator branch 26 breaks down, there is zero voltage across the resistor 42. When the voltage regulator branch 26 does break down, there is a voltage drop across the resistor 42 which is dependent on, and proportional to, the load resistance encountered across the conductor pair 29, 31. Accordingly, as the load resistance increases, the voltage drop across the resistor 42 increases in direct proportion.

Also connected to the junction 41 is a voltage controlled oscillator stage 44 which is comprised of a potentiometer 46, a plurality of resistors 43, 47, 49, 56, a capacitor 48 and a unijunction transistor 51. The input resistor 43 is of high resistance and necessarily limits the current passing to the emitter 52 of the transistor 51. Connected in series, the potentiometer 46 and the two resistors 47, 49 function as a voltage divider. The potentiometer 46 determines when the transistor 51 will fire by keeping the voltage at an emitter 52 just below the peak point or level at which oscillation occurs. The capacitor 48 determines the oscillation frequency of the oscillator stage 44. When the emitter 52 reaches a first predetermined voltage, the transistor 51 begins to conduct and a base one 53 of the unijunction transistor 51 connects the emitter 52 to ground. The emitter-base one 52–53 path allows the capacitor 48 to discharge. After the capacitor 48 discharges, the voltage on the emitter 52 of the unijunction transistor 51 is below the potential necessary to maintain conduction and the capacitor discharge path is interrupted. As a result, the secondary power supply recharges the capacitor 48 via the resistor 49 to complete the first cycle of oscillation. The resistor 56, which is connected at one end to base two 54 of the unijunction transistor 51, limits the current through transistor 51 and assists in setting the bias voltage at the emitter 52.

The power source for the oscillator stage 44 is derived from the 22.5 volt D.C., secondary power supply by the regulating action of a resistor 58 and a Zener diode 57. This combination provides a constant voltage to assure stability of the voltage controlled oscillator 44.

The oscillator stage 44 is coupled to the buffer amplifier stage 61 by a coupling capacitor 59. One end of the capacitor 59 is connected to the emitter 52 of the unijunction transistor 51 while the other end of the capacitor 59 is connected to a gate 64 of a field-effect transistor 62.

The buffer amplifier stage 61 comprises a field-effect transistor 62 and a conventional transistor 73. An RC coupler network comprised of a resistor 71 and a capacitor 72 couples the source 63 of the field-effect transistor 62 and the base 77 of the conventional transistor 73. Both the drain 66 of the transistor 62 and the collector 76 of the transistor 73 are connected to ground. A pair of biasing resistors 67, 68, connected to the gate 64 of the field-effect transistor 62 keep it as a predetermined quiescent or operating point. A pair of load resistors 69, 78 connect the transistors 62, 73, respectively, to the secondary power supply terminal 105. The buffer amplifier stage 61 has essentially a gain of unity and its purpose is to provide isolation between the oscillator stage 44 and the final amplifier stage 92.

Connected to the output of the buffer amplifier stage 61 is a tone clamp circuit 79 and a final amplifier stage 92. The tone clamp circuit 79 is comprised of a transistor 81 and a resistor 86. The collector 83 of the transistor 81 is connected to the emitter 74 of the transistor 73 of the buffer amplifier 61. The emitter 82 of transistor 81 is connected to a resistor 86 which, in turn, is connected to ground. The base 84 is connected over a lead 125 to a Zener diode 126 which is located at the output of a Schmitt trigger 107, the operation and function of which will be described below. The function of the tone clamp circuit 79 is to shunt all oscillations emitted from the oscillator stage 44 and passed by the buffer amplifier stage 61 whenever an open condition exists in one of the conductors 29, 31 under test. The transistor 81 acts as an ON-OFF switch and is normally in the OFF or inoperative condition. The series resistor 86 limits the current through the transistor 81. Whenever an open condition is detected, transistor 81 goes into saturation and thus effectively passes the signal from the oscillator 44 and buffer stages 61 to ground.

Also connected to the emitter 74 of the transistor 73 is the input of a final amplifier stage 92 which is comprised of two complementary transistors 93, 94 which together comprise a class B amplifier. The emitter 74 of the transistor 73 is coupled to the base 98 of the transistor 93 by a coupling capacitor 87 and a resistor 88, which provides additional load resistance for the transistor 73. A pair of inverse parallel connected diodes 89, 91 are used to keep the complementary transistors 93, 94 of the amplifier stage 92 from going into saturation in the presence of an input signal and to prevent an excessive reverse bias from being developed across the base-emitter junction 98–99 of the input transistor 93. A bleeder resistor 96 provides a leak-off path for the voltage built up across the coupling capacitor 89. The emitter 99 of the input transistor 93 is connected to the secondary power supply terminal 105 through a load resistor 97.

The collector 101 of the input transistor 93 is connected directly to the base 102 of the output transistor 94. The emitter 104 of the output transitsor 94 is at ground potential while the collector 103 is connected to one side of a speaker 106. The other side of the speaker 106 is connected in series with the secondary power supply through the terminal 105 to produce an audible tone from the output of a signal of the power amplifier 92.

Again referring to junction 41 in FIG. 2, the final branch is connected to a Schmit trigger circuit 107 which comprises a pair of transistors 108, 109, series resistors 111, 112, 113, 114, 117 and a capacitor 116. Since the operation of a Schmitt trigger is well known in the art, it is sufficient here to state that while one transistor conducts the other does not. During normal operaion, the voltage applied to the input resistor 111 is insufficient to cause the Schmitt trigger circuit 107 to operate. The emitters 110, 115 of the transistors 108, 109 are both directly connected to a constant voltage branch circuit 118 which is in turn, connected to ground. The constant voltage branch 118 is comprised of series connected silicon diodes 119, 121, 133, 123 whose function is to set a proper voltage level at the emitters 110, 115 of the transistors 108, 109. When the voltage developed at junction 41 exceeds a second predetermined value, set by the constant voltage branch 18, the input transistor 108 goes into saturation while the output transistor 109 comes out of saturation. As a result of this operation, the voltage at a point 124 at the output of the Schmitt trigger circuit 107 rises to the power supply voltage level. The full power supply voltage at the point 124 causes a Zener diode 126 to break down and thereby provide a drive current path to the transistor 81 in the tone clamp circuit 79.

The output of the Zener diode 126 is connected to the base 131 of a transistor 129 by a resistor 127. Also connected to the base 131 is resistor 128 which provides a path to ground. The emitter 133 of the transistor 129 is at ground potential. The collector 132 goes to an open indicator lamp 22 which is connected to the power supply through a current limiting resistor 23. The resistor 127 limits the current to the transistor 129, and the resistor 128 insures that the transistor 129 remains OFF until the Schmitt trigger circuit 107 fires. The transistor 129 functions as an ON-OFF switch by providing either a current path to an open indicator lamp 22 or by effectively blocking such current flow. Thus, whenever the transistor 129 goes ON, or into saturation, a current path is completed to operate the open indicator lamp 22.

A second indicator is comprised of another lamp 19 and is used to denote the presence of a short between the conductors 29, 31 under test. One side of the indicator lamp is connected to the emitter 13 of the transistor 12 in the current limiting circuit 10. The other side of the lamp 19 is connected to the input 11 of the current limiting circuit 10 through a current limiting resistor 21.

OPERATION

Short condition

The test circuit functions as follows whenever a short exists between the conductor pair 29, 31 under test. Power is applied to the input 11 of the current limiting circuit 10, but since the conductor pair 29, 31 is shorted, no current can flow through the conductive solution 32. One conductor 31 of the pair is normally grounded, therefore, the other conductor 29 and the circuit points 27 and 24 are similarly at ground potential. Thus, while normal power is applied to the input 11 of the current limiting circuit 10, the output point 24 is held at ground potential.

The output point 24 of the current limiting circuit 10 is at ground potential and the base 17 of the transistor 12 is at a voltage level above ground by an amount equal to the voltage across the Zener diode 16 (a typical value might be 6 volts). The forward voltage drop across the base emitter 17–13 junction of the transistor 12 is very small in comparison with the voltage across the Zener diode 16, therefore, the drop across the resistor 14 is approximately equal to that across the Zener diode 16. Since the entire power supply voltage is applied to the series combination of the resistor 14 and the emitter-collector junction of the transistor 12, the drop across the transistor 12 is equal to the power supply voltage minus the voltage across the Zener diode 16. This voltage appears across the input 11 and the emitter 13 of the transistor 12 which is in parallel with the path formed by the short indicator lamp 19 and its associated current limiting resistor 21. This voltage is sufficient to light the short circuit lamp 19 and since the output point 24 is at ground potential no current can affect the remainder of the test circuit.

No fault condition

Whenever the conductor pair 29, 31 contains no shorts or opens, the following functions take place in the test circuit. The limiting circuit 10 operates to supply a limited amount of current to the circuit path completed through one of the conductors 29, the conductive solution 32 and the other conductor 31. Since the transistor 12 is in a state of conduction, the voltage across the short circuit indicator lamp 19 will not be enough to illuminate it.

The voltage at a point 27 across the ends of the pair of conductors 29, 31 is sufficient to break down the voltage regulator branch 26 and allow current to reach the junction 41. The combined resistances of the conductor pair 29, 31 and the conductive solution 32 are arranged to be sufficiently high to allow only a small amount of current to pass through that path. Consequently, the remainder of the current flowing from output point 24 is diverted through the voltage regulator to generate a potential across the voltage sensor resistor 42.

The presence of a first predetermined voltage level across the regulator sensor resistor 42 allows the capacitor 48 to charge to a potential sufficient to bias the emitter 52 and place the unijunction transistor 51 in conduction. When the transistor 51 begins conduction, the capacitor 48 begins to discharge through the emitter-base one 52–53 path. The capacitor 48 continues to discharge to ground until the voltage on the emitter 52 decreases to the point where conduction ceases in the transistor 51. When the transistor 51 ceases to conduct, the capacitor 48 again begins to charge toward the voltage across the regulator sensor resistor 42, initiating another cycle of oscillation.

The output frequency of the oscillator stage 44 will be determined by the value of the resistance connected across the lead terminals, 27, 28, i.e., the serially combined resistances of the conductor pair 29, 31 under test, and the conductive fluid 32. As this load resistance is increased, more current is diverted through the voltage regulator 26. The additional current flow causes a higher voltage drop across the regulator sensor resistor 42 and thereby enables the capacitor 48 to charge up to oscillation voltage more rapidly.

The oscillations from the oscillator stage 44 pass through the buffer amplifier 61 to the input of the power amplifier stage 92. Normally, the power amplifier 92 is biased off, however, the signal voltage level at the output of the buffer amplifier stage 61 is sufficient to forward bias the complementary transistors 93, 94 through the action of the diode 89 across the base-emitter 98–99 junction of the input transistor 93. The amplified oscillations are converted to an audible tone by the speaker 106.

When the conductor pair under test 29, 31 is neither open nor short, the voltage at the junction point 41 does not reach a second predetermined level sufficient to break down the constant voltage branch circuit 118 and the Schmitt trigger circuit 107 does not operate. Since the Schmitt trigger 107 is unactuated, the tone clamp circuit 79 is not in a state of saturation and, therefore, presents an open circuit across the output of the buffer amplifier stage 61. Similarly, the transistor 129 does not go into a state of saturation and the open indicator lamp 22 does not light.

Open condition

When either, or both, of the conductors 29, 31 under test contain an open circuit, the current limiting circuit 10, the voltage regulator 26, the voltage controlled oscillator 44, and the buffer amplifier all operate identically as if the conductors 29, 31 contained no faults. However, since an open circuit now exists across the test terminals 27, 28 all the current is diverted through the voltage regulator circuit 26 and a maximum voltage condition exists across the regulator sensor resistor 42. As the voltage at the junction point 41 reached a first predetermined value, the voltage controlled oscillator circuit 44 was triggered into operation as described above in connection with a no fault condition. In an open condition, however, the voltage at the junction point continues to increase above the first predetermined value to a second predetermined value governed by the constant voltage branch circuit 118. This voltage operates the Schmitt trigger circuit 107 to place the input transistor 108 into a state of saturation and bring the output transistor 109 out of saturation.

The operation of the Schmitt trigger 107 allows the voltage at the output junction 124 to rise toward the power supply and thereby break down and initiate conduction in the Zener diode 126. When the Zener diode 126 conducts, a potential is applied over lead 125 to the base electrode 84 of the transistor 81 which comprises the tone clamp circuit 79. The clamp transistor 81 goes into a state of saturation and connects the output of the buffer amplifier 61, through the now conducting transistor 81 and the resistor 86 to ground, thereby preventing the signals produced by the oscillator 44 from reaching the power amplifier 92 and effectively muting the audible tone which would otherwise be produced by the speaker 106. The breakdown of the Zener diode 126 also applies a potential to the base electrode 131 of the transistor 133 which, likewise, goes into a state of saturation. The collector-emitter 132–133 path of the transistor 129 illuminates the open circuit lamp 22 to indicate the condition of the conductor pair 29, 31 under test.

Although the instant circuit has been described in the context of a cable testing apparatus, it is to be understood that numerous other applications are possible. The circuit may be used to respond to whether a test or control voltage across the input terminals 27, 28 is above, below, or between first and second predetermined voltages. By varying the values of the Zener diodes which comprise the voltage regulator 26 and the regulator sensor resistor 42, the lower or first predetermined voltage may be chosen to actuate the tone at any level desired. By varying the values of the Zener diodes in the constant voltage branch circuit 118, the voltage difference between the first and second predetermined voltages may be made as great or as small as necessary. A typical value of difference in the two levels, as used in the cable testing circuit, is 1 volt, however, values in the range of a few millivolts have been achieved.

Another readily apparent application of this instant circuit is that of electrical component testing and sorting. That is, resistors could be selected from a mixed lot, tested with the circuit, and sorted into three groups composed of a "set" value, higher than "set" value, and lower than "set" value. The tolerance with which those of "set" value are selected may be varied by changing the voltage difference between the first and second predetermined voltages as described above.

It will be understood that the embodiments and alternatives are illustrative of the principles of the invention and many others could be devised, without departing from the spirit and scope of the invention.

What is claimed is:

1. In a circuit for detecting the voltage drop across an article,
   means for connecting an electrical power source across said article to develop a voltage drop which is proportional to the impedance of said article,
   a voltage detecting circuit including a junction point connected to said article for applying a voltage to said junction point which is indicative of the voltage developed across said article,
   a normally quiescent oscillator circuit connected to said junction point initiated into operation upon the junction point attaining a predetermined voltage,
   means energized by operation of said oscillator circuit for indicating that the voltage at said junction point has attained said predetermined value,
   a voltage responsive switching circuit connected between said indicating means and said oscillator circuit for diverting the output of said oscillator from said indicating means, and
   a trigger circuit having means responsive to the voltage at said junction point attaining value higher than said predetermined value for applying a voltage to said switching circuit to actuate said switching circuit.

2. A circuit as set forth in claim 1 in which,
   said signal indicating means includes an amplifier and a speaker connected to said voltage responsive switching circuit for receiving the output of said oscillator circuit.

3. In a circuit for detecting the voltage across an article,
   a voltage sensitive branch circuit connected across said article, including Zener diode means and a resistor series connected at a junction point;
   normally unoperated oscillator means connected to said junction point across said resistor and triggered into operation upon the voltage across said article exceeding the breakdown potential of said Zener diode means and the voltage at said junction point reaching a first predetermined voltage;
   a normally unoperated Schmitt trigger circuit connected to said junction point acros said resistor and operated upon the voltage across said article exceeding the breakdown potential of said Zener diode means and the voltage at said junction point reaching a second predetermined voltage, greater than said first predetermined voltage;
   means responsive to the operation of said oscillator for indicating that the voltage across said article exceeds the breakdown potential of said Zener diode means and the voltage at said junction point has reached said first predetermined voltage; and
   switch means connected between said oscillator means and said indicating means and operative in response to the operation of said Schmitt trigger for inhibiting the functioning of said indicating means.

4. In a circuit for detecting the voltage drop across an article,
   means including a constant current source connected to said article for developing a voltage across said article;
   a voltage detecting circuit connected across said article, including series connected Zener diode and resistor means;
   a normally quiescent oscillator connected across said resistor means and initiated into operation upon the voltage across said resistor means reaching a first predetermined voltage;
   a normally unoperated Schmitt trigger circuit connected across said resistor and operated upon the voltage across said resistor means reaching a second predetermined voltage which is greater than said first predetermined voltage;
   a buffer amplifier connected to said oscillator;
   a power amplifier connected to said buffer amplifier;
   means responsive to the output of said power amplifier for producing an audible tone to indicate the voltage across said resistor means has reached a first predetermined voltage; and
   switching means connected between said buffer amplifier and said power amplifier and responsive to the operation of said Schmitt trigger circuit for diverting the output of said oscillator from said tone producing means when the voltage across said article is above the second predetermined voltage.

5. A circuit for determining the voltage drop across the ends of a pair of conductors, comprising:
   a voltage sensitive branch circuit connected across first ends of said conductors, including Zener diode means and first resistor means serially connected at a junction point;

a second resistor means connected across the second ends of said conductors;

means responsive to a range of predetermined voltage drops across said first resistor means for generating an output signal;

normally unoperated means connected to said signal generating means for blocking said output signal;

means responsive to a voltage drop across said first resistor in excess of said range of predetermined voltage drops for operating said blocking means to indicate an open circuit in said pair of conductors;

a transistor having a base, a collector, and an emitter;

means connecting said emitter to a first end of a first of said conductors;

means interconnected between said base and said first end of the first of said conductors for maintaining constant the potential therebetween;

a third resistor means interconnected between said collector and base;

means for connecting an electrical power source across said collector and a first end of said second conductor to render said transistor conductive; and means rendered effective upon said conductors making electrical contact, whereupon the entire potential of the power source is connected across the emitter-collector path of said transistor and the first resistance to increase the effective emitter-collector resistance for indicating that said conductors are shorted into contact.

References Cited

UNITED STATES PATENTS

| | | | |
|---|---|---|---|
| 3,026,505 | 3/1962 | Bevilacqua | 340—253 |
| 3,072,895 | 1/1963 | Kaufman | 324—133 XR |
| 3,157,870 | 11/1964 | Marino et al. | 324—133 XR |
| 3,243,794 | 3/1966 | Phillips et al. | 340—248 |
| 3,277,364 | 10/1966 | Abrahamson | 324—51 XR |
| 3,284,707 | 11/1966 | Clinton | 324—51 XR |
| 3,300,659 | 1/1967 | Watters | 340—248 XR |
| 3,300,689 | 1/1967 | Beddoes | 317—31 XR |
| 3,341,748 | 9/1967 | Kammiller. | |
| 3,412,392 | 11/1968 | Jenkins et al. | 324—133 XR |

GERARD R. STRECKER, Primary Examiner

U.S. Cl. X.R.

324—51